United States Patent [19]

Soures et al.

[11] 3,986,130
[45] Oct. 12, 1976

[54] LASER APPARATUS

[75] Inventors: John Michael Soures, Pittsford; John Frederick Hoose, Rochester, both of N.Y.

[73] Assignee: University of Rochester, Rochester, N.Y.

[22] Filed: Oct. 9, 1974

[21] Appl. No.: 513,364

[52] U.S. Cl. .......................... 330/4.3; 331/94.5 C
[51] Int. Cl.² ...................... H01S 3/02; H01S 3/00
[58] Field of Search ................ 330/4.3; 331/94.5 P, 331/94.5 D; 350/299

[56] References Cited
UNITED STATES PATENTS

| | | | |
|---|---|---|---|
| 3,424,991 | 1/1969 | Martin | 331/94.5 D |
| 3,453,559 | 7/1969 | Sharp et al. | 330/4.3 |
| 3,581,229 | 5/1971 | Martin | 330/4.3 |
| 3,631,362 | 12/1971 | Almasi et al. | 331/94.5 P |
| 3,794,929 | 2/1974 | Carr | 331/94.5 P |

*Primary Examiner*—Nelson Moskowitz
*Assistant Examiner*—N. Moskowitz
*Attorney, Agent, or Firm*—Martin Lukacher

[57] ABSTRACT

A multibeam laser amplifier system is disclosed wherein a plurality of laser beams may be amplified to high power with high efficiency. The beams may then be directed upon a target such as a nuclear fusion fuel element, as in a laser fusion reactor. The system is made up of an array of dual, active mirror laser amplifier units. The laser beams are reflected between successively disposed ones of these units. The units are optically pumped by flash lamps which are arranged in close proximity to the reflective sides of the laser bodies in each unit.

14 Claims, 3 Drawing Figures

LASER APPARATUS

The present invention relates to laser apparatus and particularly to multibeam high power laser amplifiers.

The invention is especially suitable for use in laser fusion systems for providing a multiplicity of high power laser beams which can be simultaneously applied to a target region containing nuclear fusion fuel, such as deuterium pellets and the like, so as to produce nuclear fusion reactions.

In laser fusion systems it is necessary to provide laser light energy of extremely high levels and concentration in order to produce the requisite nuclear fusion reactions. It is desirable that the laser light be provided in a number of beams which are then made incident upon the target region of the reactor which contains the nuclear fuel. In this way the target may be more uniformly illuminated and, since each beam may be separately amplified, the total energy directed to the target may be increased. Reference may be had to U.S. Pat. No. 3,723,246 issued to M. J. Lubin on Mar. 23, 1973 for further information respecting laser fusion systems.

In laser amplifiers, optical pumps such as flash lamps irradiate bodies of laser material with high intensity electromagnetic radiation having the appropriate wave length to be absorbed in the laser material. The laser light is then generated, by the well-known laser effect, into coherent electromagnetic radiation of the wave length characteristic of the laser material. The energy requirements of laser fusion systems make the overall efficiency of conversion of the pumping radiation into laser light extremely significant, particularly as regards the cost of operating and constructing laser fusion systems and reactors is concerned.

A particularly suitable laser configuration for providing high power gain laser amplification is the so-called "face-pumped laser device". Such devices include a disc or slab of an active laser material having planar end surfaces with transverse areas which are large as compared to the thickness of the slab as measured in the lateral direction across its edges between the planar end surfaces. Inasmuch as the optical pumping radiation can be applied by way of the planar end surfaces substantially isometrically throughout the body of laser materials, significant amounts of pumping energy can be applied to the laser material with more uniformity than is the case with rods or other geometric configurations of the laser material. Reference may be had to the following patents as well as to the patents and publications mentioned therein for further information respecting face-pumped lasers: U.S. Pat. Nos. 3,500,231; 3,525,053; 3,534,291; 3,581,229; 3,679,996; and 3,679,999.

It has been found, in accordance with the invention, that a plurality of laser beams can be amplified simultaneously and with high efficiency through the use of an array of face-pumped lasers wherein the laser units are arranged in the array to provide a plurality of paths in each of which different ones of the laser beams are separately reflected between successive bodies of laser material in different face-pumped laser units. The face pumped laser units are provided by bodies of laser material which have their end faces adjacent and opposed to each other. Optical pumping means are located between the adjacent opposed end faces and simultaneously pump both laser material bodies. In other words, a single optical pumping means, say utilizing a single bank of flash lamps, drives two laser amplifiers which are arranged in the array to provide active mirror amplifiers for the plurality of laser light beams.

By virtue of the aforementioned arrangement of active laser material bodies and pumping means, the efficiency of the multibeam laser amplifier system may nearly be doubled with the resulting constructional and operational advantages. The efficiencies are obtained even as compared to optical pumping arrays using reflectors; it having been found that such reflectors add only about 18 percent to the optical flux obtained by pumping without the use of such reflectors.

Accordingly, it is an object of the present invention to provide improved laser apparatus.

It is another object of the present invention to provide apparatus for producing high power laser energy through the amplification of a multiplicity of laser beams with high efficiency.

It is a still further object of the present invention to provide laser apparatus for the generation of high power laser energy which is especially adapted for use in laser fusion reactors and other laser fusion systems.

The foregoing and other objects and advantages of the invention will be more readily apparent from a reading of the following description in connection with the accompanying drawings in which.

Figure 1:
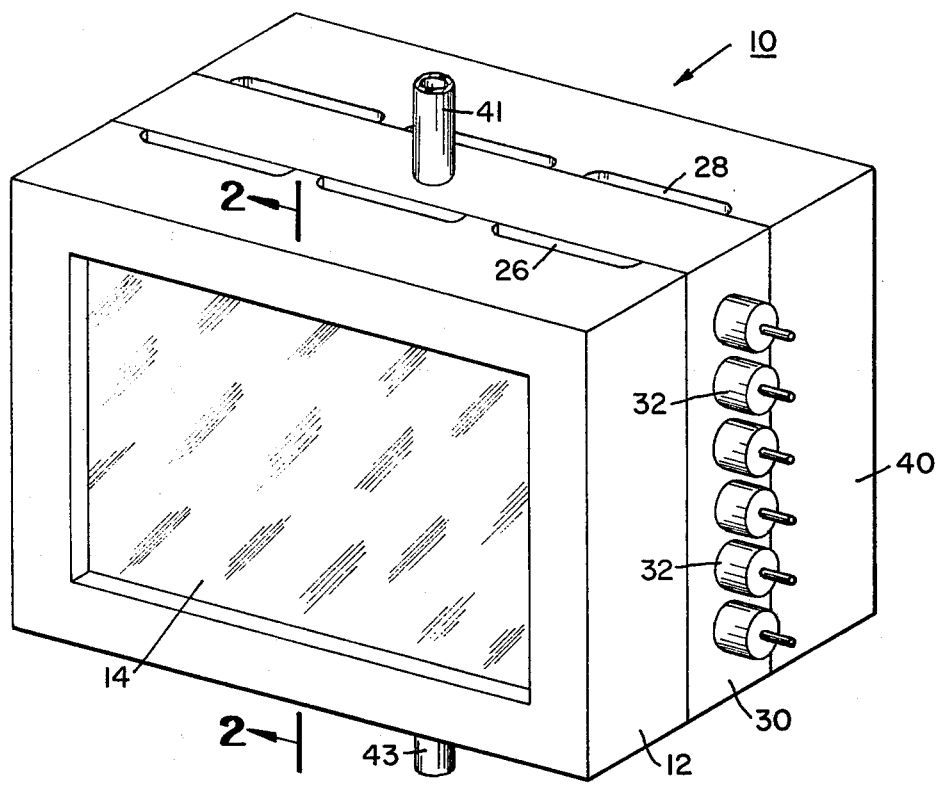
FIG. 1 is a perspective view of a double sided active mirror laser amplifier unit in accordance with the invention.
Figure 2:
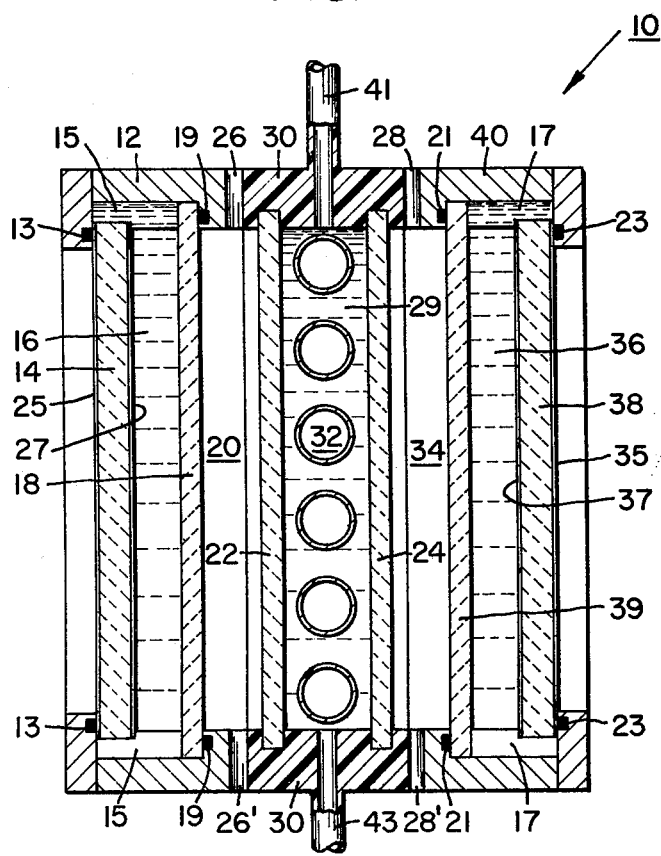
FIG. 2 is a cross sectional view of the amplifier unit shown in FIG. 1, the section being taken along the line 2—2 in FIG. 1.

Referring to FIGS. 1 and 2, there is shown a double sided active mirror laser amplifier unit 10. The envelope of this unit is a rectangular parallelepiped. Within a metal frame 12, there is disposed a rectangular disc or plate 14 of laser material. The end surfaces of the laser glass body 14 are planar and have transverse dimensions which may typically be 15 to 20 centimeters in length by 10 to 15 centimeters in width. The thickness dimension of the glass may be about ten percent of the maximum length of the disc. The material of the plate 14 may be a neodymium doped glass. In this case the $Nd_2O_3$ doping of the glass may be decreased as the thickness of the glass increases so as to maintain a more uniform deposition of energy in glass and therefore minimize distortion of the glass due to thermal gradients.

A chamber 16 is provided in the frame 12 behind the inner end surface of the plate 14 by a plate 18 of heat resistant glass, such as Pyrex. The active laser glass 14 is spaced from the sheet 18 by a number of spacers 15 which are L-shaped blocks disposed around the inner perimeter of the frame 12. By virtue of the spacers 15 the laser glass 14 and the sheet 18 are held in sealed relationship against 0 rings 13 and 19. The chamber 16 thus extends around the outer edges of the laser glass 14.

The chamber 16 is filled with a liquid which serves both as a heat transfer medium and for optical purposes as will be later explained. A suitable medium is a ferric chloride solution. Preferred, however, is the liquid, supplied by the Owens Illinois Company and described in an article by Dube and Boling appearing in Applied Optics, April 1974, Page 669 et seq and entitled "Liquid Cladding for Face Pumped Nd: Glass Lasers."

The front surface of the laser glass plate 14 is desirably coated with a film 25 which transmits and prevents reflection of radiation at the laser energy wavelength. For the neodymium doped glass this wavelength is 1.06 micrometers. Various dielectric coatings are available for this purpose, magnesium oxide being suitable. A coating, which may be in the form of a multi-layer dielectric film 27 on the inner end surface of the laser glass plate 14, provides high reflectance for the laser energy wavelength (1.06 micrometers) as well as high transmission at optical pumping radiation wavelengths. The latter wavelengths are where the neodymium glass laser material absorbs the pumping energy, and may be in the wavelength interval from 0.35 to 0.9 micrometers.

A bank of flash lamps 32, which may be in the form of tubes which extend through a rectangular frame 30 at the ends thereof, are contained between sheets 22 and 24 of heat resistant glass such as Pyrex. Ports 41 and 43 extend through the upper and lower sides of the frame 30. Water or other cooling fluid may be circulated through the chamber 29 formed by the frame 30 and the sheets 22 and 24 for purposes of cooling the lamps 30. The lamps 30 may be Xenon flash lamps which provide pumping radiation in the bands where the laser glass has high absorption (viz, 0.35 to 0.9 micrometers).

A plurality of notches 26 and 26' may be provided along the inner edge of the frame 12 so that an inert gas such as nitrogen may be circulated through a space or chamber 20 which is provided between the plates 18 and 22 for further improving the heat transfer characteristics of the amplifier unit, and also avoiding ionization effects of more active gases, such as air.

Symmetrically disposed about the lamps 32 is the other side of the two-sided active mirror amplifier unit 10. This side is made up of a laser glass plate 38 with anti-reflective coating 35 and reflective coating 37. A sheet 39 of heat resistant glass, such as Pyrex, is spaced behind the inner end surface of the laser glass plate 38 and defines a chamber 36 which is fluid filled with a fluid of the same type as used in the chamber 16. Notches 28 provide for the flow of the inert gas such as Nitrogen through the space of chamber 34 between the glass sheet 24 which defines the lamp container and the glass sheet 39. O rings 21 and 23 and spacers 17 locate the laser glass sheet 38 and plate 39 in a rectangular frame 40. The frame 40 is similar to the frame 12; the laser glass plate 38 and the plate 14 are also similar as are the dimensions and locations of the other similar parts of each of the active mirror sides of the unit 10.

The lamps 32 may be flashed by electrical energy, say from a condenser bank, being applied across the lamps via terminals at the opposite ends thereof. When the lamps are flashed they provide high levels of illumination which is transmitted through the Pyrex sheets 18, 22, 24, 39, to the laser glass plates 14 and 38. The illumination passes through the liquid in the chambers 16 and 36 since that liquid is characterized by high transmissivity at the pumping wavelengths produced by the discharge in the lamps 32. The liquid in the chambers 16 and 36 is also characterized by having high absorption of the laser energy wavelengths (1.06 micrometers). As will be explained more fully in connection with FIG. 3, the amplifiers operate by amplifying laser light which enters through their forward end surfaces and is incident on and is reflected from the reflective film or coatings 27, 37, on the inner or mirror surfaces of the active laser material. Spurious laser emission, at the laser light wavelength, which may occur due to transverse reflections from the edges of the laser glass plates 14 and 38, are absorbed by the liquid and thus suppressed. The liquid not only provides for heat transfer and cooling of the laser glass, but by virtue of its extending around the edges of the laser glass plates, absorbs laser emission which might be reflected in the transverse direction and thus not contribute to the gain and amplification provided by the laser material.

The laser amplifier units may for example be located on an optical bench and spaced slightly from the surface of the bench. The arrangement may be covered by a hood which is filled with inert gas such as Nitrogen. The gas then will circulate through the vents provided by the notches 26 and 28, thus reducing the possibility of any ionization of the atmosphere which may absorb pumping energy and thus reduce the efficiency of the amplifier system.

It will be appreciated that bolts and screws for assembling the frames 12, 30 and 40 such that they may provide an integral assembly, have been omitted to simplify the illustration. In the event that only a single-sided active mirror amplifier is needed, one of the mirror units may be removed, thus either single or double sided units may be provided as may be needed for various system requirements. It will be observed as the description proceeds that some of the amplifier units in the array shown in FIG. 3 need only be single sided active mirror units. The mirror units illustrated in connection with FIGS. 1 and 2 are therefore advantageous in that they may be used either in their single or double mirror configuration.

Figure 3:
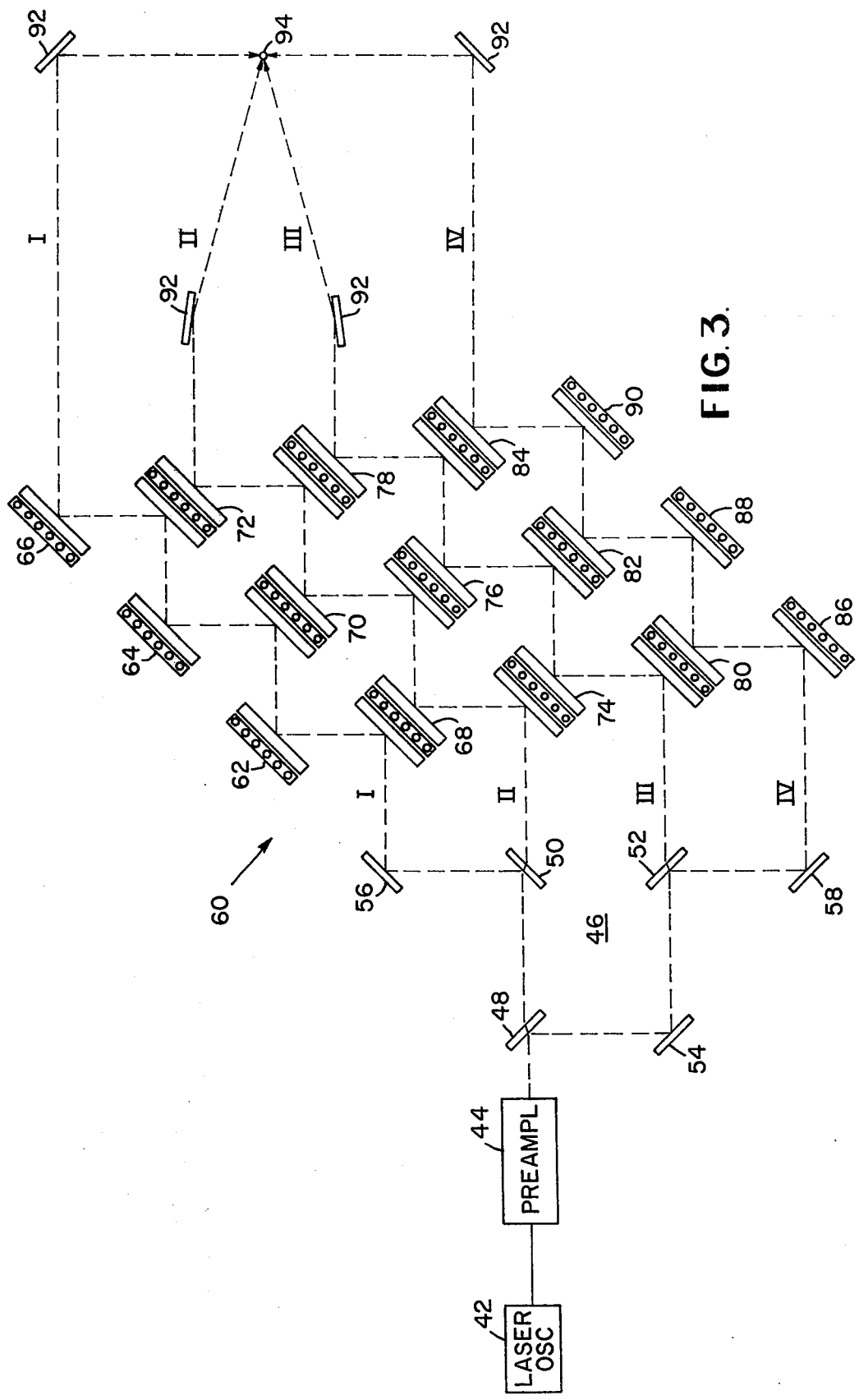
FIG. 3 is a schematic view illustrating a multibeam high power laser amplifier system utilizing laser amplifier units of the type shown in FIGS. 1 and 2, the system embodying the invention.

Referring more particularly to FIG. 3, there is shown a multibeam laser amplifier system which embodies the invention. The system as illustrated provides for the amplification of four beams indicated as I, II, III and IV. These beams are obtained from a single source indicated as a laser oscillator 42 and preamplifier 44. While the beams are shown as single ray paths, it will be appreciated that they have areas commensurate with the areas of the end surfaces of the laser glass (14, 38, FIGS. 1 and 2) of the amplifier units. The laser oscillator may be a commercially available oscillator which produces a pulse when triggered. The preamplifier 44 may be a rod type laser amplifier utilizing a neodymium glass rod surrounded by linear flash lamps. The amplified beam is passed through a beam splitter arrangement 46 consisting of three beam splitters 48, 50 and 52, and three reflecting mirrors 54, 56, 58, which provide the four input beams with equal power. Additional beam splitters may be used to provide additional beams. In the event that only two beams are needed, one of the beam splitter and mirror sets, say that consisting of the mirrors 54 and 58 and the beam splitter 52, may be omitted; as may be the amplifier units which amplify the third and fourth beams III and IV.

It will be understood that the input beams may have different energy levels and that different amplification may be provided by providing amplifier units with different gain in the different beam paths.

A matrix or array 60 of amplifier units is provided for amplifying the laser light beams 1 through IV. The array as illustrated provides for six stages of amplification for each beam; more stages being used if desired.

The array is provided by a multiplicity of laser amplifier units 62 through 90. The units are arranged in rows and columns. The units are laterally offset from each other in each row so as to provide a path for reflection of the beams between the units which make up adjacent rows. Thus, the first beam is reflected beween the row consisting of the three units 62, 64 and 66, and the row consisting of the units 68, 70 and 72. It will be noted that the units 62, 64 and 66 as well as the units 86, 88 and 90 in the rows which define the edges of the array, are single-sided active mirror units; whereas the remaining units are double sided active mirror units, as shown in FIGS. 1 and 2. The flash lamps of the double sided units in the second, third and fourth rows, thus serve the purpose of providing optical pumping energy for amplifying, not one, but two, of the beams which are amplified by the array. This affords the above-mentioned increased efficiency of the multibeam laser amplifier system as provided by the invention. Other increases in efficiency are afforded by the features of construction of the amplifier unit described in connection with FIGS. 1 and 2.

As shown in FIG. 3, the input beams may be equally spaced from each other. The spacing of the amplifier units in the array will then be equal (i.e. equal spacings of rows and columns). It will be appreciated that other spacings may be provided in the event that it is desired to change the direction of the beams within the array. It also may be desired to utilize only double-sided active mirror units in the array which thereby still further enhance the efficiency of operation of the system. In that event, reflectors may be provided so as to direct the beams in the reverse direction (i.e. from the output end of the array to the input end of the array) so as to pass successively through the laser material bodies of the double-sided mirrors in the rows at the edges of the array. Alternatively, it may be desired to provide only two input beams and then to utilize beams splitters at the output end of the array. The portions of the output beams may then be reflected backwardly along paths which include reflectors and the active mirrors provided by the reflectively coated laser materials of double-sided units disposed along the rows at the edges of the array. Two of the split beams may then be afforded with additional amplification before being reflected in the output direction as an additional output beam. By substituting mirrors for amplifier units in the array and by changing the power gain of individual units, various combinations of output beam power may be afforded, as desired.

Reflectors 92 or other focussing means are provided for reflecting the output beams onto a target region 94 which may be within a laser fusion reactor. Nuclear fusion fuel, such as deuterium pellets may be located in the target region. Then, by simultaneously triggering the laser oscillator and the flash lamps in the preamplifier as well as in the laser amplifier system a laser beam pulse is generated and amplified so as to result in nuclear fusion reactions at the target region 94. It is also possible to provide various electronic delays in different ones of the beam paths so as to shape different ones of the beam, say for pre-exitation purposes as described in the above referenced Lubin patent.

From the foregoing description it will be apparent that there has been provided improved laser apparatus which can provide a multiplicity of high power laser beams which are especially suitable for use in laser fusion systems. In addition to the variations and modifications of the hereindescribed laser amplifiers and laser amplifier systems, other modifications and variations within the scope of the invention, will undoubtedly suggest themselves to those skilled in the art. Accordingly, the foregoing description should be taken merely as illustrative and not in any limiting sense.

What is claimed is:
1. Laser amplifier apparatus which comprises
   a. a source providing a laser light beam,
   b. means for splitting said beam into a plurality of beams,
   c. a multiplicity of face pumped laser amplifiers, a plurality of said amplifiers having a pair of planar bodies of laser material having their end faces opposed to each other, optical pumping means disposed between said opposed end faces for simultaneously optically pumping said pair of bodies, and
   d. said amplifiers being disposed in an array to provide a plurality of paths each for a separate one of said beams along which each of said separate beams is reflected successively between the bodies of laser material in successive ones of said amplifiers whereby to amplify said plurality of beams for application to a target.
2. Laser amplifier apparatus adapted for amplifying a plurality of laser light beams, said apparatus comprising
   a. a plurality of planar bodies of laser material each having major surfaces with transverse dimensions larger than the lateral distance between its major surfaces, said bodies being arranged in an array in laterally offset and transversely spaced relationship to define a plurality of separate paths through the array each for a different one of said beams between different adjacent, transversely spaced ones of said bodies, said beams entering and exiting each of said bodies through one of its major surfaces and being reflected at the other major surfaces thereof,
   b. a plurality of optical pumping means adjacent to the other major surfaces of said bodies to provide laser amplification of the beam passing therethrough, and
   c. a plurality of said bodies being disposed closely adjacent to the same one of said optical pumping means to define a laser amplifier unit containing a pair of said bodies with their said other major surfaces disposed on opposite sides of one of said optical pumping means to thereby both be illuminated by pumping energy therefrom.
3. The invention as set forth in claim 2 wherein said array consists of columns and rows, said beam paths each extending through the space between an adjacent pair of said rows.
4. The invention as set forth in claim 3 wherein each of said rows disposed internally of said array contains a plurality of said laser amplifier units which includes a pair of said bodies illuminated by the same one of said optical pumping means.
5. The invention as set forth in claim 4 wherein the major faces of each of said bodies in said array are parallel to each other.
6. The invention as set forth in claim 4 wherein the bodies in different ones of said units are also transversely offset from each other to define equal angles of incidence and reflection for said beams from said other major surfaces thereof.
7. The invention as set forth in claim 6 including a laser which provides a beam of laser light, beam splitting means for separating said beams into a plurality of beams which are laterally spaced from each other corresponding to the lateral spacing of said rows in said array and directed to be incident upon different ones of said bodies in different ones of said rows of the column at one edge of said array into which said beams enter.

8. The invention as set forth in claim 7 including means disposed adjacent to the columns at the edge of said array opposite from said one edge from which said beams exit for directing said beams to be incident upon a target region.

9. Laser apparatus comprising
   a. a pair of bodies of laser material each having planar end surfaces having transverse dimensions substantially larger than the lateral thickness dimension across the edges of said body between said end surfaces thereof,
   b. said bodies being disposed closely adjacent to each other with an end surface of one of said bodies being opposed to an end surface of the other of said bodies to define a space therebetween,
   c. optical pumping means disposed in said space for illuminating said bodies simultaneously through their said opposed end surfaces, and
   d. housing means assembling said bodies and pumping means into a unitary structure open at each of said end surfaces of said bodies opposite to their said opposed end surfaces for receiving and emitting laser radiation therethrough.

10. The invention as set forth in claim 9 wherein said bodies are plates of laser glass, and said pumping means includes a bank of lamps extending parallel to the end surfaces of said plates, said opposed end surfaces being coated to define a film transmissive for radiation at said pumping wavelengths and reflective for the laser radiation wavelength from said bodies.

11. The invention as set forth in claim 10 including a means disposed between each of said plates of laser glass and said lamp bank for defining chambers each filled with liquid, said chamber defining means and said liquid having high transmission for radiation of pumping wavelengths from said lamps and said liquid having high absorption for laser radiation wavelength from said bodies.

12. The invention as set forth in claim 11 wherein said liquid has substantially the same index of refraction as said laser glass.

13. The invention as set forth in claim 11 including means defining walls on the opposite sides of said lamp bank, said housing means, said walls and said chamber defining means further defining second chambers each between said liquid filled chambers and a different one of said walls, said second chamber having vents thereto for the filling thereof with an inert gas.

14. The invention as set forth in claim 13 including means for circulating cooling fluid between said opposite walls around said lamp bank.

* * * * *